L. Yale, Jr.,
Lock,
No. 1,470. Reissued Apr. 28, 1863.
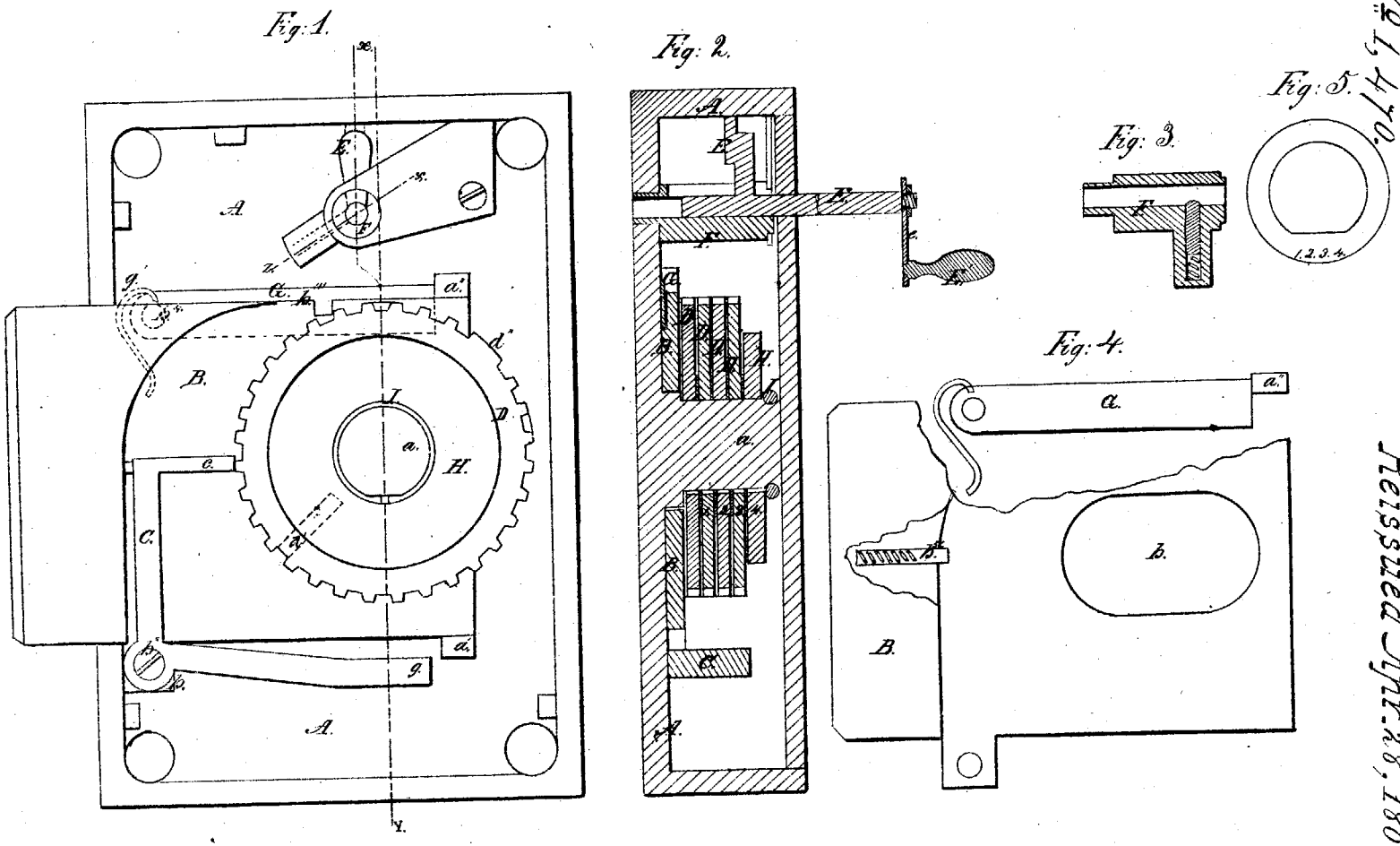

UNITED STATES PATENT OFFICE.

LINUS YALE, JR., OF SHELBURNE FALLS, MASSACHUSETTS.

IMPROVEMENT IN LOCKS.

Specification forming part of Letters Patent No. 1,326, dated May 14, 1861; Reissue No. 1,470, dated April 28, 1863.

*To all whom it may concern:*

Be it known that I, LINUS YALE, Jr., formerly of Philadelphia, but now residing at Shelburne Falls, Massachusetts, have invented certain new and useful improvements in that class of locks in which each tumbler is set separately to its proper position by a key or its equivalent, or by hand, as in alphabetical or index locks, as distinguished from or contrasted with that class of locks in which all the tumblers are set at one time, or nearly so, by the action of a key or bit; and I declare the following to be a full, clear, and exact description of my improvements, reference being had to the drawings, in which—

Figure 1 is an elevation of the lock, one side of the case being removed. Fig. 2 is a section through the lock on the line *x y* of Fig. 1. Fig. 3 is a section through the key-curb. Fig. 4 is a detail view of the bolt and bolt lever or keeper. Fig. 5 is a plan of one of the washers.

In this lock I have introduced several improvements, the principal ones relating, first, to the method of operating the tumblers, and, secondly, to the method of preventing picking. In this class of locks difficulty is often experienced in setting the tumblers, imperfect sight of the operator, or want of light, or a wrong position of the eye preventing the indices usually employed from being brought to the exact spot which they must assume before the tumblers are adjusted and the lock can be unlocked. In order to obviate this defect I have combined a tumbler with a revolving tooth on a separate shaft, the combination being such that a whole revolution of the tooth moves the tumbler only through the angular distance between two of its consecutive notches. Locks of this class have also been picked by new processes impossible to describe fully except in a specification of inordinate length, but depending for their success upon distinguishing one tumbler from the others and the difference between false and true notches on either of them, by forcing the stump against the tumblers and noting the position of an index attached to the instrument, whatever it may be that retracts or tends to retract the bolt; and I have remedied this defect in this class of locks by combining, with tumblers set or adjusted separately and in succession, a bolt, and a vibrating stump or fence attached thereto, said fence acting to stop the motion of the bolt at one and the same point irrespective of the precise tumbler or precise notch of a tumbler against which the stump is forced. In this lock the bolt is shown at B, and is guided as usual by the gate in the rim and by two pins, $a'$ $a^2$. In the bolt is an aperture, *b*, permitting it to slide past the post *a*. The post *a* is strongly secured to or made in one piece with the lock-plate A, and is a cylinder with one side flattened. This flattening is merely to prevent the washers 1 2 3 4 from revolving. Upon the post are packed the tumblers D D D, free to revolve thereon, and between the tumblers are the washers, the whole pack of washers and tumblers being held in place by a stout washer, H, secured by a spring-ring, I, taking into a groove on top of the post. These tumblers are gated or deeply notched, as at *d*, for the entrance of the stump, and have also false notches surrounding them, as at 1′ 2′ 3′, &c., such notches also serving as cog-teeth, by means of which each tumbler can be revolved. These notches extend all round the tumblers, except at one spot, as at $d''$, where their original rim is left uncut, so as to secure a point of departure from which to count the position of the stump-notch when the tumblers are revolved. The bolt has pivoted to it at $b^4$ an ordinary guard-tumbler, G, held in abutment against the pin $a^2$, which serves as a stop for this tumbler.

Upon the bolt B, and pivoted at $b^2$, is the vibrating safety-fence C. Part of this fence at *c* serves as an ordinary stump, and inserted in the bolt is a spring-pin, $b^5$, which bears against the stump and holds its end *g* out of contact with the stop $a'$. If the lock is put on the door with the side at *x* upward, this pin is unnecessary, as the force of gravity will then keep the end *g* depressed. Near the tumblers is secured in the lock the key-curb F, free to revolve, and bored out and slotted from end to end for the passage of the revolving tooth, which sets the tumblers, and also serves as a bolt-mover. The shape of this tooth and its shaft are clearly shown in the drawings, and on its shaft are twined a series of grooves whose distance from center to center is the same with that of the tumblers, and into these grooves takes a spring-pin attached to the curb, and clearly shown in Fig. 3. This pin permits the key to be shoved out and in within the case of the lock, and serves to determine the position of the tooth, so that the tumbler upon which it is acting may be known. The distances between the true notches or gates into which the bolt-stump must enter before the lock can be unlocked and the blank spot on the periphery of the tumblers vary in each tumbler, and the number of tumblers may vary from two upward.

In order to unlock the lock, one of the tumblers is to be turned by the revolving tooth operated by the crank until the blank is felt. When the tooth strikes the blank, further revolution in the same direction is impossible. The key is then to be shoved in or pulled out, and another tumbler set in the same way until all the blanks lie over each other. Then by acting on each tumbler separately each one is to be revolved by the crank and tooth until the gate or true notch comes opposite the stump on the bolt, the necessary amount of revolution being known and depending upon the construction of each tumbler, or, in other words, the number of notches between the blank spot and true gate. The key is then shoved in and turned, so as to lift the guard-tumbler, hold it lifted, take into the talons $b^3$ and retract the bolt. In so doing the stump $c$ will enter the true notches. Now, it will be noted that each tumbler is moved separately, and when adjusted remains in the position for the stump to enter without being held in place by the key, thus differing from that class of locks in which the tumblers are lifted all at once and held in position by a key or bits while the lock-bolt is being retracted. It will also be observed that a whole revolution of the crank and tooth only turns each tumbler one notch. No index on the crank is therefore needed, all that is necessary being to count the turns of the crank; and it makes no difference whether the crank commences to turn from a precise spot or finishes its revolution at a precise spot, so long as it moves through such a portion of a revolution as will turn the tumbler upon which it is acting through the angular distance between two notches. This arrangement, therefore, dispenses with indices, permits opening of the door in the dark as well as in the light, and obviates the difficulties arising from imperfect vision or false position of the eye of the operator.

In case the lock is attempted to be opened by a person not knowing the true set of the tumblers and the relative angular position between the blanks $d'$ and the true notches, he must endeavor to set the tumblers experimentally, and then ascertain whether their arrangement is correct by forcing the bolt backwards. When he does so, the stump, as soon as it touches any tumbler, will compress the spring and locate its long end (the fence) against the stop $a'$, thus preventing the bolt from retracting farther, and always bringing it up against the stop $a'$, and at exactly the same point of retraction, no matter what tumbler or part of a tumbler it touches. This peculiarity of the sameness of range of motion of the bolt when forced back effectually prevents a lock-picker from distinguishing between the different tumblers, or discovering their true set, or that arrangement of the gates which will alone permit the bolt to be retracted.

In locking, the bolt is to be shot, and the tumblers are then, by means of the tooth, to be moved so that their true notches are no longer opposite the stump.

I claim as of my own invention—

1. The combination of a revolving tumbler with a revolving tooth, the two being relatively arranged so that a revolution of the latter moves the former only through the angular distance from one of its teeth to the next in succession, the combination being substantially such as described, 2. In combination with a pack or series of tumblers set separately and in succession, a vibrating fence, and a bolt, and a proper stop against which the fence may abut, the whole being and operating substantially as set forth.

3. In combination, a revolving tooth, a pack or series of tumblers, a vibrating fence, and a bolt, the whole operating substantially as hereinbefore specified.

In testimony whereof I have hereunto subscribed my name on the 17th day of March, A. D. 1883.

LINUS YALE, JR.

In presence of—
L. JOHN YALE,
JOHN HOSKINS.